US009554131B1

(12) United States Patent
Haskell et al.

(10) Patent No.: US 9,554,131 B1
(45) Date of Patent: Jan. 24, 2017

(54) MULTI-SLICE/TILE ENCODER WITH OVERLAPPING SPATIAL SECTIONS

(71) Applicant: HARMONIC INC., San Jose, CA (US)

(72) Inventors: Paul Haskell, Saratoga, CA (US); Purvin Pandit, Franklin Park, NJ (US)

(73) Assignee: Harmonic, Inc., San Jose, CA (US)

( * ) Notice: Subject to any disclaimer, the term of this patent is extended or adjusted under 35 U.S.C. 154(b) by 250 days.

(21) Appl. No.: 14/203,343

(22) Filed: Mar. 10, 2014

Related U.S. Application Data

(60) Provisional application No. 61/857,500, filed on Jul. 23, 2013.

(51) Int. Cl.
*H04N 7/12* (2006.01)
*H04N 19/436* (2014.01)

(52) U.S. Cl.
CPC ............... *H04N 19/00521* (2013.01)

(58) Field of Classification Search
CPC ................................. H04N 19/00521
USPC ........................... 375/240, 240.21
See application file for complete search history.

(56) References Cited

U.S. PATENT DOCUMENTS

| | | | | |
|---|---|---|---|---|
| 8,532,383 B1* | 9/2013 | Thakkar | ............... | G06T 7/0079 382/173 |
| 2002/0094025 A1* | 7/2002 | Hanamura | ....... | H04N 21/23432 375/240.01 |
| 2002/0174311 A1* | 11/2002 | Ware | ................... | G06F 13/1684 711/167 |
| 2004/0151244 A1* | 8/2004 | Kim | ....................... | H04N 19/70 375/240.03 |
| 2006/0114985 A1* | 6/2006 | Linzer | .................... | H04N 19/00 375/240 |
| 2008/0192831 A1* | 8/2008 | Kim | ..................... | H04N 19/176 375/240.24 |
| 2010/0027680 A1* | 2/2010 | Segall | .................. | H04N 19/119 375/240.24 |
| 2010/0284460 A1* | 11/2010 | Tsai | ..................... | H04N 19/176 375/240.12 |
| 2011/0026611 A1* | 2/2011 | Kenji | ................. | H04N 19/0089 375/240.29 |
| 2011/0211642 A1* | 9/2011 | Cho | ...................... | H04N 19/102 375/240.16 |
| 2012/0230408 A1* | 9/2012 | Zhou | .................... | H04N 19/105 375/240.15 |
| 2012/0257678 A1 | 10/2012 | Zhou et al. | | |
| 2012/0314767 A1 | 12/2012 | Wang et al. | | |
| 2013/0322755 A1* | 12/2013 | Seo | ....................... | G06T 7/0085 382/173 |

OTHER PUBLICATIONS

ITU-T, Series H: Audiovisual and Multimedia Systems, Infrastructure of audiovisual services—Coding of moving video, Advanced video coding for generic audiovisual services, Recommendation ITU-T H.264, Apr. 2013, 732 pages.

(Continued)

*Primary Examiner* — Jorge L Ortiz Criado
*Assistant Examiner* — Benjamin Pezzner
(74) *Attorney, Agent, or Firm* — Brokaw Patent Law PC; Christopher J. Brokaw

(57) ABSTRACT

Roughly described, pictures are divided into multiple spatial sections to be encoded by multiple section encoders. To address discontinuities of compression decisions across section boundaries, the multiple section encoders encode overlapping regions in a picture.

22 Claims, 5 Drawing Sheets

(56) References Cited

OTHER PUBLICATIONS

ITU-T, Series H: Audiovisual and Multimedia Systems, Infrastructure of audiovisual services—Coding of moving video, High efficiency video coding, Recommendation ITU-T H.265, Apr. 2013, 317 pages.

Chi et al., "Improving the Parallelization Efficiency of HEVC Decoding," Proceedings of IEEE International Conference on Image Processing (ICIP 2012), Orlando, FL, USA, Sep. 2012, 4 pages.

Sullivan et al., "Overview of the High Efficiency Video Coding (HEVC) Standard," IEEE Transactions on Circuits and Systems for Video Technology, May 25, 2012, pp. 1649-1668.

Tudor, P., "MPEG-2 Video Compression," Electronics & Communication Engineering Journal, Dec. 1995, 17 pages.

* cited by examiner

MULTI-SLICE/TILE ENCODER WITH OVERLAPPING SPATIAL SECTIONS

CROSS-REFERENCE TO OTHER APPLICATIONS

Applicants hereby claim the benefit under 35 U.S.C. 119(e) of U.S. provisional application No. 61/857,500, filed 23 Jul. 2013. The provisional application is hereby incorporated by reference herein in its entirety.

BACKGROUND

The invention relates to video encoding, and more particularly to the use of parallel encoding techniques to improve speed or reduce artifacts or both.

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263, ITU-T H.264/MPEG-4, Part 10, Advanced Video Coding (AVC), and ITU-T H.265, High Efficiency Video Coding (HEVC) standard, and extensions of such standards, to transmit, receive and store digital video information more efficiently.

AVC is defined in ITU-T, Series H: Audiovisual And Multimedia Systems, Infrastructure of audiovisual services—Coding of moving video, Advanced video coding for generic audiovisual services, Recommendation ITU-T H.264 (April 2013), incorporated by reference herein, and HEVC is defined in ITU-T, Series H: Audiovisual And Multimedia Systems, Infrastructure of audiovisual services—Coding of moving video, High efficiency video coding, Recommendation ITU-T H.265 (April 2013), also incorporated by reference herein. As used herein, a system or method is considered to comply with "the AVC standard" so long as it complies with any version of that standard. Similarly, a system is considered to comply with "the HEVC standard" so long as it complies with any version of that standard.

The AVC and HEVC standards both accommodate a variety of profiles, each specifying an image resolution, a scanning type (progressive or interlaced) and a refresh rate, among other things. The profiles include one that has been labeled 1080p, which is in common use today as an HDTV transmission format. The 1080p profile specifies a resolution of 1920×1080 pixels progressively scanned. Another profile specified in both standards is one that has been labeled 4K UltraHD, having a resolution of 3840×2160 pixels progressively scanned, with a 60 Hz refresh rate. There is increasing interest in the industry for making 4K UltraHD widely available.

It is technically very challenging to encode 4K UltraHD video live. Whereas encoders are currently available to encode 1080p live, much more extensive processing power is needed for 4K UltraHD video.

One way to handle this challenge is to divide the video signal into "slices" or "tiles" and to use multiple encoders, one for each slice (tile). FIG. 1 shows a picture divided into four slices numbered 1 through 4. Both the AVC and HEVC standards support multiple slice encoding and HEVC also supports multiple tile encoding. As used herein, the term "spatial section" refers to any type of spatial division of a picture, including both slices and tiles. The encoders assigned to handle different spatial sections are sometimes referred to herein as section encoders. The terms "slice" and "tile" have the meanings given to them in the AVC and HEVC standards.

A drawback of multiple slice or multiple tile encoding is that the boundaries between the spatial sections often show compression artifacts. Compression artifacts can arise because each encoder makes its own encoding decisions based on the picture information within its own spatial section. These include decisions related to motion vectors, quantizer indices, deblocking filtering, among others. Since each encoder has different picture information, many encoding decisions will be discontinuous across the boundary, causing the decoded video on either side of the boundary to look different. These differences cause the boundary to be visible as an annoying compression artifact.

A common approach to eliminate these discontinuities is to have the various section encoders share information about their coding decisions near the boundaries. This sharing even can involve sharing many lines of video data, for example to enable motion compensation across section boundaries or to perform in-loop deblocking filtering across the boundaries. This information sharing can require significant bit-rates (many hundreds of Mb/s for 4K UltraHD) and can require very low latency communications. These problems are not limited to 4K UltraHD live video encoding specifically; they apply to any format for which encoding of video at the desired speed is difficult or expensive with then-current technology.

SUMMARY

An opportunity therefore arises to create robust solutions to the problem of encoding video at a desired quality and speed, particularly the encoding of live streams of very high density or resolution video in real time. Better video reproduction, with higher density and more visually appealing images, may result.

Roughly described, the invention involves dividing the pictures into multiple spatial sections to be encoded by multiple section encoders, and to address the discontinuity of compression decisions across section boundaries by having the multiple section encoders encode overlapping regions in a picture. This concept can be used for example to build live 4K UltraHD encoders more simply and easily than with previous approaches.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Figure 1:
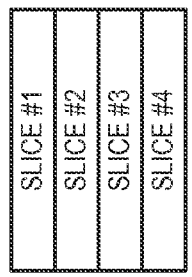
FIG. 1 illustrates a picture divided into four slices for multiple slice encoding.
Figure 2:
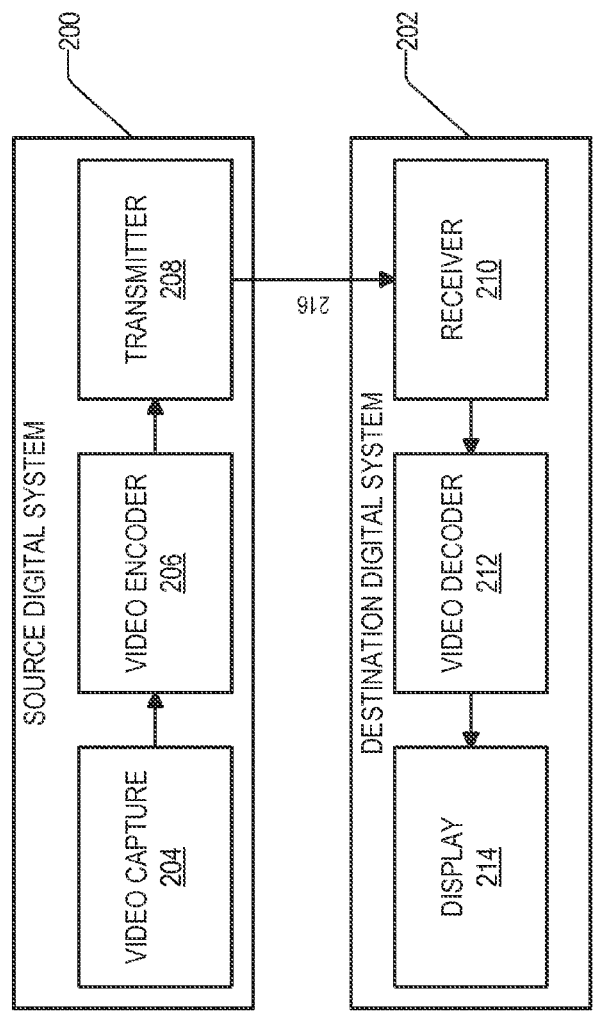
FIG. 2 illustrates an example end-to-end system for video capture, transmission and display.

FIG. 2 illustrates an example end-to-end system for video capture, transmission and display. It comprises a source digital system 200, in which video is captured (or otherwise provided) by a video capture module 204, and sent to a video encoder 206 for encoding. The encoded output from video encoder 206 is sent to a transmitter 208. The encoded video signal is transmitted via medium 216 to a destination digital system 202 in which the signal is received by receiver 210. The received encoded video signal is then provided to a video decoder 212 which decodes it and provides it to a display 214 or other destination device. The video encoder 206 is required by specification to encode the video from video capture module 204 at a high speed. Typically the requirement derives from a need to encode the video live, so that images displayed on the display 214 can keep up with the images being captured by video capture module 204. However, even for off-line encoding, where the video capture module 204 may be for example a pre-recorded movie, business and other practical reasons may drive a need or desire to encode the video at high speed.

Figure 3:
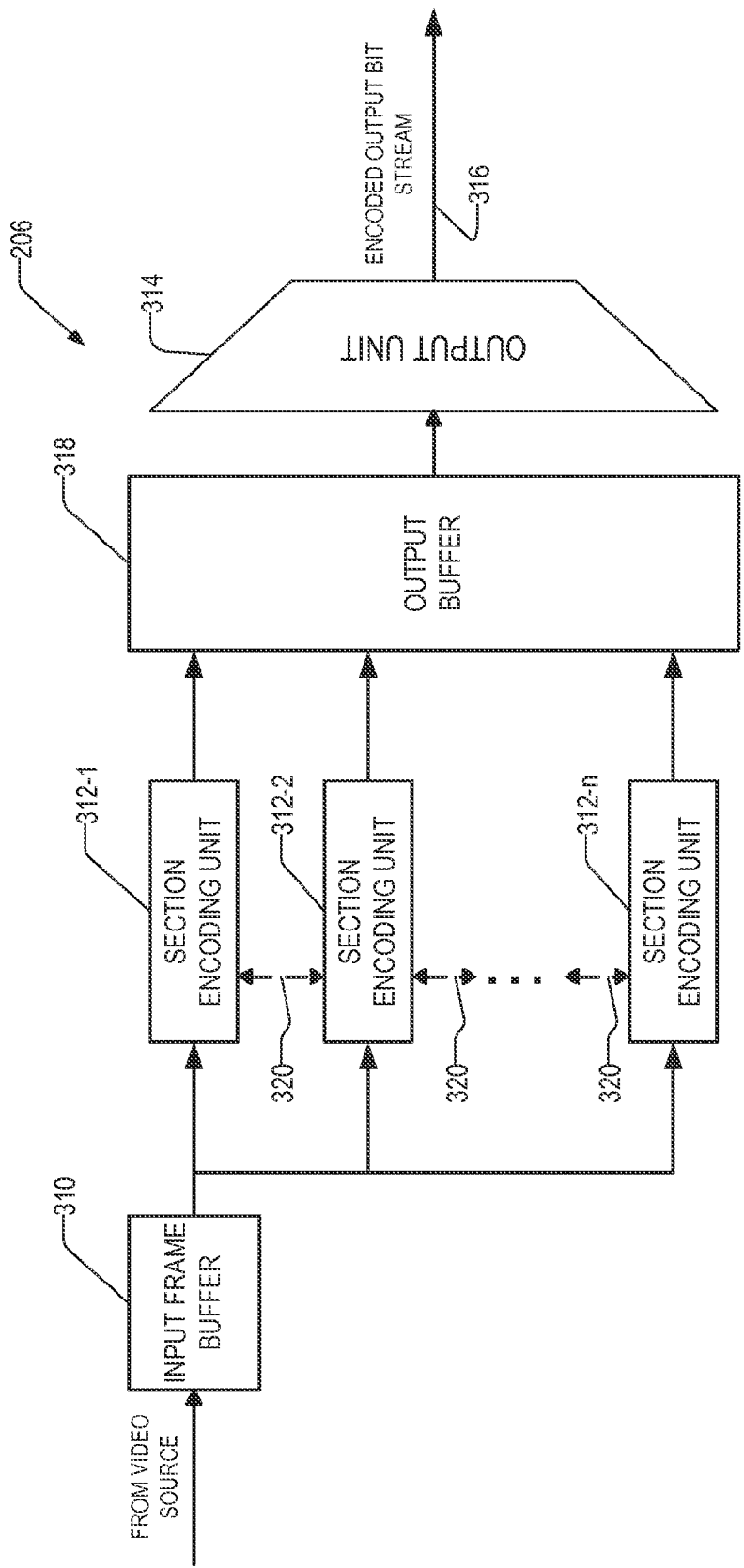
FIG. 3 is a block diagram of the video encoder of FIG. 2.

FIG. 3 is a block diagram of the video encoder 206 (FIG. 2). In the embodiment of FIG. 3, the input video signal from video capture module 204 is provided to an input frame buffer 310. Though the input frame buffer 310 can store the video information in different formats in different embodiments, in one embodiment it is stored as complete pictures, 8 bits per color per pixel. The input frame buffer 310 may store two or more complete pictures operated as a first-picture-in-first-picture-out buffer.

The output of frame buffer 310 is provided to a plurality of parallel section encoding units 312-1, 312-2, . . . , 312-$n$ (collectively 312). Each section encoding unit 312 is connected to retrieve from the input frame buffer 310 the pixel data for the picture section or sections that it is encoding. The encoding units 312 in various embodiments represent separate hardware modules, or separate software threads running on a multi-core processor, or separate software processes running on separate processors or servers, or separate software processes running on separate virtual machines, and so on. In some embodiments they can even represent separate tasks sharing a single processor, though the benefits of parallelism might be limited in such an embodiment. The video encoder 206 may or may not also include communication paths 320 between section encoding units 312 as described below. The encoded outputs of the section encoding units 312 are provided to an output buffer 318, and an output unit 314 merges all the encoded spatial sections into a common encoded output bit stream 316 conforming to the appropriate AVC or HEVC standard.

Figure 4:
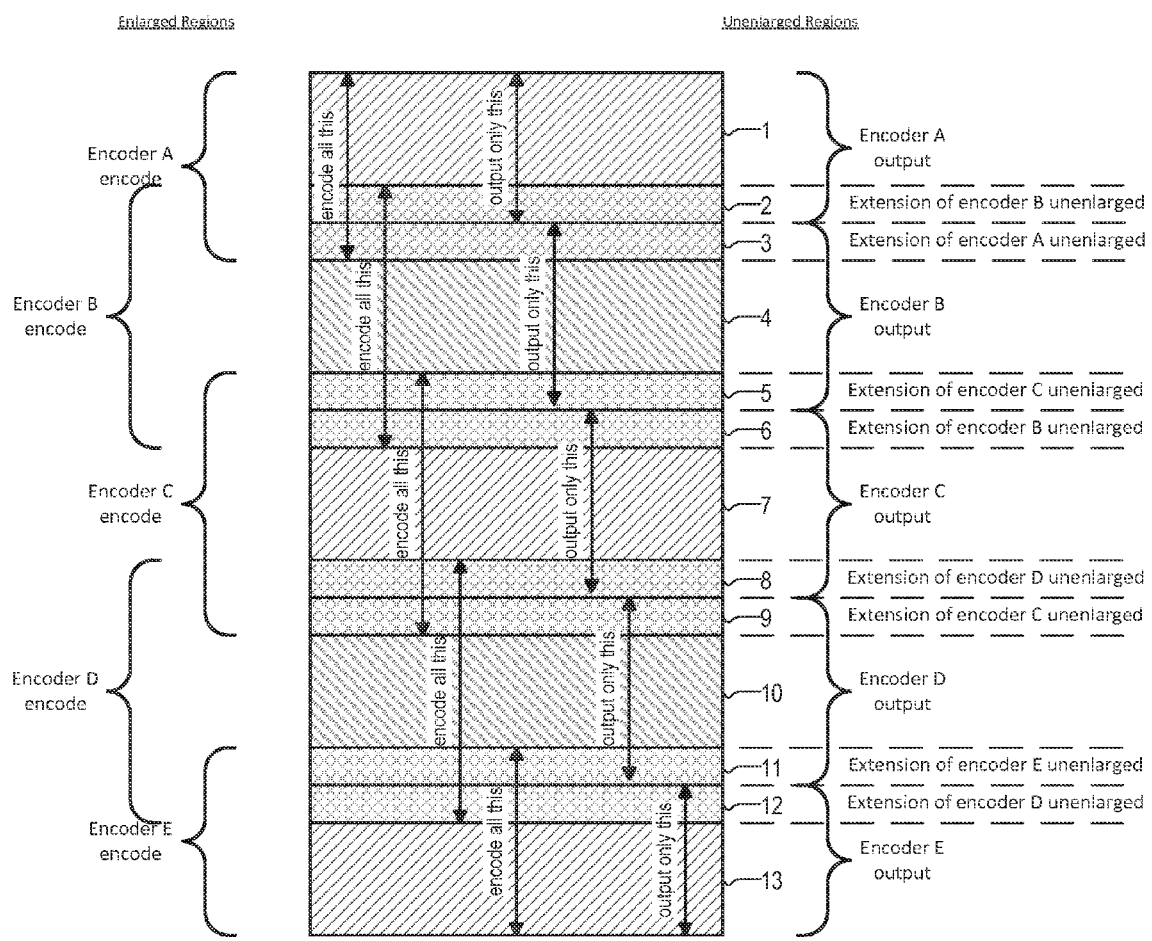
FIG. 4 illustrates an example division of a picture incorporating features of the invention.

The operation of section encoding units 312 will be described with reference to an example division of a picture for 4K UltraHD as shown in FIG. 4. In FIG. 4, the image is divided into 5 overlapping horizontal strips, sometimes referred to herein as "enlarged" regions, containing lines of the incoming picture as follows:

Encoder A encodes lines [0,575]
Encoder B encodes lines [448,959]
Encoder C encodes lines [832,1343]
Encoder D encodes lines [1216,1727]
Encoder E encodes lines [1600, 2159]

While each encoder encodes a set of video lines that overlaps with its neighbors, only a set of smaller, non-overlapping regions, sometimes referred to herein as "unenlarged" regions, are used in the ultimate encoded output bit stream 316:

lines [0,511] come from Encoder A
lines [512,895] come from Encoder B
lines [896,1279] come from Encoder C
lines [1280,1663] come from Encoder D
lines [1664,2159] come from Encoder E Thus except at the top and bottom picture boundaries, each "enlarged" region encoded by an encoder includes not only its own "unenlarged" region, but also an "extension" region above and below which overlaps into the adjacent "unenlarged" regions above and below, as indicated in the drawing. The top region does not have an extension region above, and the bottom region does not have an extension region below.

The regions are "slices" in this example, though in a different embodiment they can be tiles or other spatial sections. Whether slices or tiles, each region preferably contains an integer number of coding units.

The overlap of regions in FIG. 4 allows each section encoder to have information about its neighbor slices for use in motion estimation, rate control, and in-loop deblocking filtering. This information even can be used to help align rate control decisions on opposite sides of each slice boundary. There will be some small differences in coding between how a slice encoder will encode the extension region and how its neighboring slice encoder will encode the portion of its unenlarged region which overlaps with that same extension region, but those differences should be small enough to prevent annoying compression artifacts.

A challenge with this approach is for each slice encoder to generate a legal bitstream only for its output lines and not for the entire enlarged region which it encodes. This can be handled by using the "slice" syntax that is part of the AVC and HEVC standards. Each enlarged region is divided into three sub-regions: the unenlarged region in the center, the extension region above, and the extension region below. (As used herein, a "sub-region" is itself considered to be a "region") The extension regions are shown in FIG. 4 as being double-cross-hatched. In one embodiment each slice encoder encodes its three sub-regions as separate slices, but while encoding the unenlarged sub-region, it is able to look across the sub-region boundaries to the adjacent extension sub-regions in order to take into account image features that occur in the portion of the unenlarged adjacent region which overlaps with the extension sub-regions. Aspects of the encoding process including but not limited to one or more of the following take into account features in adjacent overlapping sub-regions: in-loop deblocking filtering, motion estimation and motion compensation, rate control information, mode decision information, and so on. In an alternative embodiment, each encoder encodes its entire enlarged region as a single slice. In either case, on output, each encoder's top and bottom encoded extension sub-regions are discarded. Only the encoded unenlarged region from the encoder is passed to the encoded output bit stream. Each sub-region preferably is defined so as to have an integer number of Coding Units or macroblocks (henceforth "CU's"). So in the example of FIG. 4, each of the sub-regions 1-13, separately, has a respective integer number of CU's. The sizes of the extension sub-regions need not be constant for all the encoding regions, but preferably they are (except where they are omitted at a picture boundary).

If an HEVC encoder is used tiles can also be used instead of or in addition to slices. Also, whereas in FIG. 4 the slices are shown as rectangles extending horizontally all the way to both left-and-right boundaries, in another embodiment this is not necessary. Slices can be shorter than the picture width, and/or they can wrap around to include subsequent lines and can be non-rectangular. Tiles preferably extend entirely across a picture, either vertically or horizontally, but need not in all embodiments. In addition, the splitting of pictures into slices (tiles) for the encoding process typically is fixed for all pictures in a video, but it can be varied for different pictures if desired. In general, the slice (tile) preferably is enlarged for encoding purposes in all directions except where its boundaries abut a picture boundary.

Returning to FIG. 3, with the picture division example of FIG. 4, encoders A-E preferably correspond to section encoding units 312-1 through 312-5, respectively. Thus encoding unit 312-1 encodes sub-regions 1-3 of FIG. 4; encoding unit 312-2 encodes sub-regions 2-6; encoding unit 312-3 encodes sub-regions 5-9; encoding unit 312-3 encodes sub-regions 8-12; and encoding unit 312-5 encodes sub-regions 11-13. Each section encoding unit 312 retrieves the pixel data of its assigned subregion(s) from the input frame buffer 310 when needed. Thus the pixel data for each of the extension subregions will be retrieved twice: once by the encoding unit encoding the above-adjacent slice, and once by the encoding unit encoding the below-adjacent slice. However, preferably none of the encoding units retrieves any pixel data for any regions outside of the enlarged region which it is assigned to encode.

While in the above example each encoder is assigned to encode a respective, fixed one of the image slices, this is not actually a requirement in all embodiments of the invention. Nor is there any actual requirement that the number of encoding units 312 equals the number of slices (tiles) in a picture. For full utilization of the available units, it is desirable to start a new slice (tile) in each encoding unit 312 promptly after it finishes the prior one, and slices may be assigned to encoding units in whatever sequence they becomes available. This means the number of encoding units 312 may be more or less than the number of spatial sections into which pictures are divided in a particular embodiment.

The encoded outputs from the slice (tile) encoding units 312 are provided to output buffer 318. In one embodiment, each section encoding unit 312 writes into output buffer 318 only the encoded bit stream for the unenlarged region to which it was assigned. The encoded versions of the extension regions are thus discarded by the section encoding units 312, and the output buffer 312 contains only bit stream data that will be used in the formation of the encoded output bit stream 316. In another embodiment, each section encoding unit 312 writes into output buffer 318 the encoded bit stream that it formed for its entire enlarged region. In this case the output buffer 312 will contain more than one encoded version of each of the extension regions. Output unit 314 then selects into the encoded output bit stream 316 only the version that is part of an unenlarged region, discarding the version that was encoded only as an extension region. In either case, the output unit 314 provides on the encoded output bit stream only one version of each region of each picture.

In one embodiment, each section encoding unit 312 encodes its enlarged region without any picture-by-picture information about coding decisions made for other ones of the enlarged regions. In this case no communication paths 320 are required among the different section encoding units 312. In such an embodiment it is preferable that high level guidance be provided to each of the encoding units 312 in order to help guide their internal processes. For example, the output bit rates should be fixed (though not necessarily identical) for each of the encoding units 312 in order that each entire picture (or sequence of pictures) can achieve a desired combined bit rate. As another example, average quantization values can be provided externally to each of the encoding units 312, as well as other information for guiding the quantization process.

In another embodiment, each section encoding unit 312 does communicate certain information with the encoding units encoding adjacent slices. Communication paths 320 are used for this purpose. The information communicated in this embodiment between encoding units 312 may include such dynamically developed information as motion vectors calculated for the extension regions, motion vector partitions, coding modes, choice of reference picture, and pixel values reconstructed for in-loop deblocking filtering. The more information that is communicated between the section encoding units 312, the better the encoding units should be able to suppress visual artifacts at the slice boundaries. However, limitations in communication bandwidth may make it impossible to share complete information between encoding units. In particular, communication paths 320 are not used to transmit to a particular encoding unit any raw pixel data from outside the enlarged region that the particular encoding unit is encoding.

Figure 5:
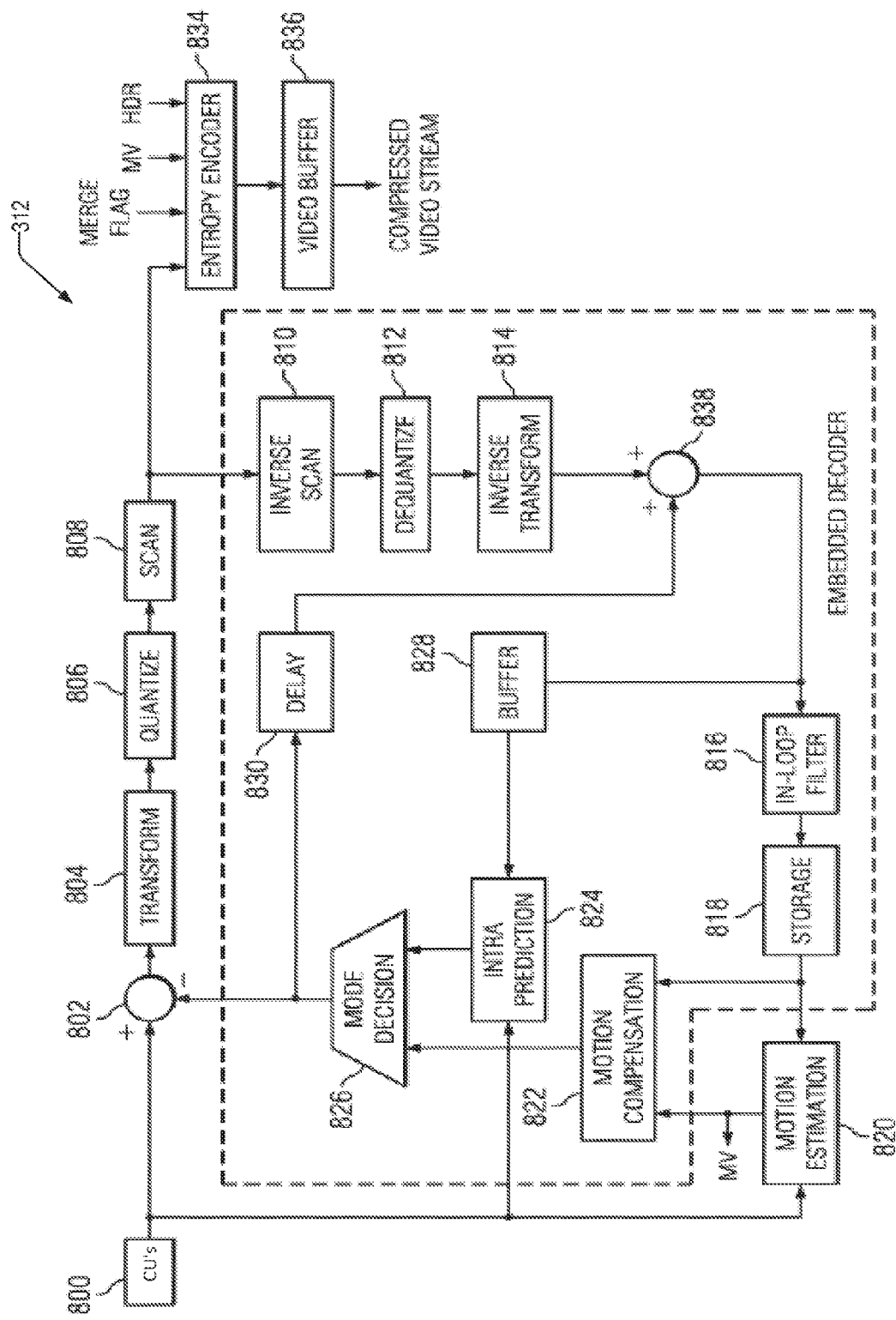
FIG. 5 is a block diagram of one of the section encoding units usable in some embodiments of FIG. 3.

The units 312 do not necessarily have to be all identical, but preferably they are. FIG. 5 is a block diagram of one of the section encoding units 312 usable in some embodiments. The FIG. 5 encoding unit embodiment operates in a conventional manner, such as is described in US Patent Application Pre-Grant Publication No. 2012/0257678, incorporated by reference herein. Another description of a conventional encoder, usable in some embodiments of the invention, can be found in Tudor, P. N., "MPEG-2 Video Compression," tutorial, Electronics & Communication Engineering Journal, vol. 7, issue 6, pp. 257-264 (December 1995), also incorporated by reference herein.

Figure 6:
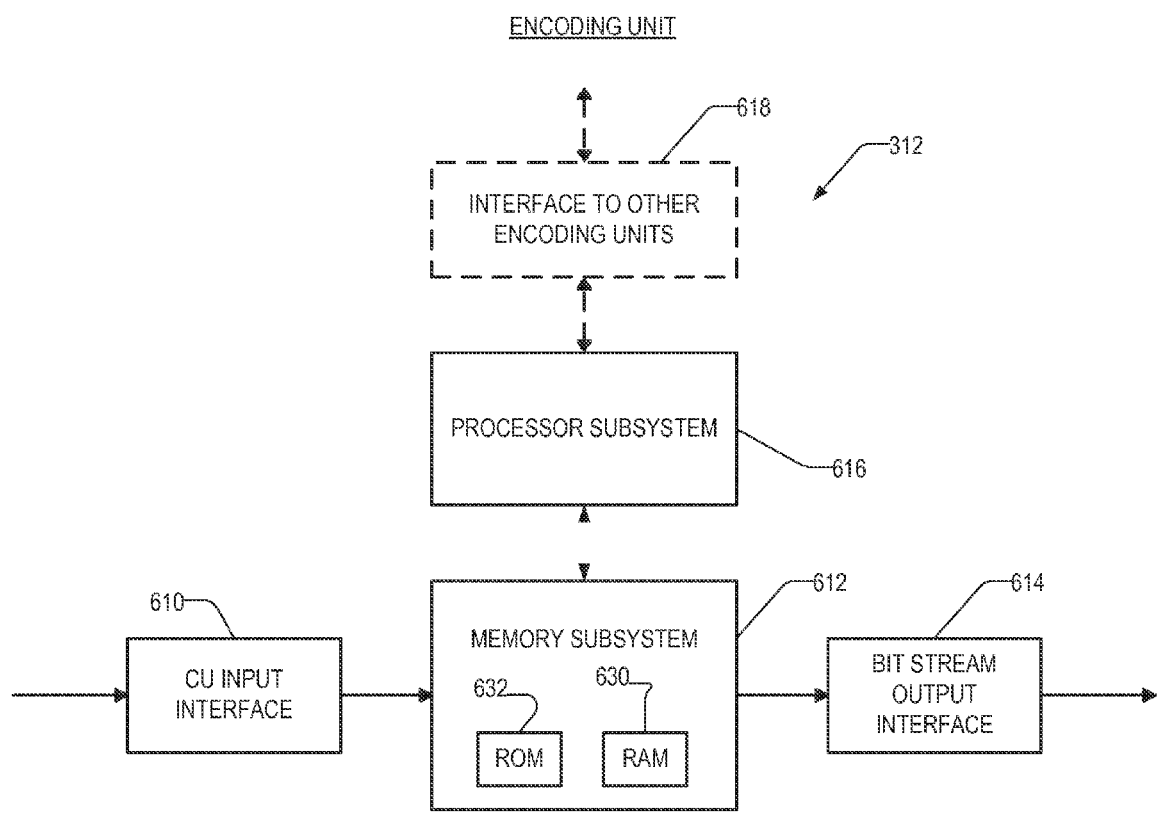
FIG. 6 is a block diagram of one of the section encoding units usable in other embodiments of FIG. 3.

FIG. 6 is a block diagram of one of the section encoding units 312 in another embodiment. Whereas the embodiment of FIG. 5 illustrates a module-oriented structure, the embodiment of FIG. 6 illustrates a structure in which most of the functionality performed by the modules of FIG. 5, are performed by software modules running on a processor subsystem instead. The actual functions performed by the software in order to encode spatial sections may be the same as those set forth schematically in FIG. 5, and the software may also be organized into the same or similar modules.

Referring to FIG. 6, encoding unit 312 includes a CU input interface 610 which retrieves the picture data that it needs from input frame buffer 310 and writes it into a local memory subsystem 612. The encoding unit 312 also includes a bit stream output interface 614 for writing the encoded bit stream from memory subsystem 612 to the output buffer 318. Also in communication with the memory subsystem 612 is a processor subsystem 616 which, in an embodiment that includes inter-unit communication paths 320, also communicates through an interface 618 with those paths 320.

Local memory subsystem 612 includes RAM and may also include ROM and/or other data storage components. Local memory subsystem 612 stores program code and data. The program code, when applied to processor subsystem 616, causes the encoding unit 312 to perform the steps involved in encoding the assigned spatial section. The data includes input pixel data retrieved from input frame buffer 310, and encoded output data for writing to the output buffer 318, as well as data formed at many intermediate steps in the encoding process.

CU input interface 610 may in one embodiment retrieve the pixel data by DMA (Direct Memory Access), and then writes the same pixel data, also by DMA, to local memory in the memory subsystem. The processor subsystem 616, under control of the program code, programs the DMA controllers with start addresses for reading, start addresses for writing, and an indication of how many data bytes to transfer. In another embodiment the processor subsystem 616 may retrieve the data from the input frame buffer 310 directly instead, and/or may write the data into the memory subsystem 612 directly instead. In all such embodiments only the pixels for the enlarged region that the particular section encoding unit 312 is encoding, are copied into the memory subsystem 612.

Similarly, bit stream output interface 614 in one embodiment retrieves the encoded output data by DMA from the memory subsystem 612, and then writes the same data, also by DMA, to the output buffer 318. The processor subsystem 616, under control of the program code, programs the DMA controllers with start addresses for reading, start addresses for writing, and an indication of how many data bytes to transfer. In another embodiment the processor subsystem 616 may retrieve the data from the memory subsystem 612 directly instead, and/or may write the data into the output buffer 318 directly instead.

The following documents are incorporated by reference:
G. J. Sullivan; J.-R. Ohm; W.-J. Han; T. Wiegand. "Overview of the High Efficiency Video Coding (HEVC) Standard". IEEE Transactions on Circuits and Systems for Video Technology. (2012 May 25);
Ching Chi, Mauricio Alvarez Mesa, Ben Juurlink, Valeri George, and Thomas Schierl, Improving the Parallelization Efficiency of HEVC Decoding, Proceedings of IEEE International Conference on Image Processing (ICIP 2012), Orlando, Fla., USA, September 2012;
ITU-T, Series H: Audiovisual And Multimedia Systems, Infrastructure of audiovisual services—Coding of moving video, Advanced video coding for generic audio-visual services, Recommendation ITU-T H.264 (April 2013);
ITU-T, Series H: Audiovisual And Multimedia Systems, Infrastructure of audiovisual services—Coding of moving video, High efficiency video coding, Recommendation ITU-T H.265 (April 2013); and
U.S. Pre-grant patent publications 2012/0314767 (Wang) and 2012/0257678 (Zhou).

As used herein, a given signal, event or value is "responsive" to a predecessor signal, event or value if the predecessor signal, event or value influenced the given signal, event or value. If there is an intervening processing element, step or time period, the given signal, event or value can still be "responsive" to the predecessor signal, event or value. If the intervening processing element or step combines more than one signal, event or value, the signal output of the processing element or step is considered "responsive" to each of the signal, event or value inputs. If the given signal, event or value is the same as the predecessor signal, event or value, this is merely a degenerate case in which the given signal, event or value is still considered to be "responsive" to the predecessor signal, event or value. "Dependency" of a given signal, event or value upon another signal, event or value is defined similarly.

Applicants hereby disclose in isolation each individual feature described herein and each combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. Applicants indicate that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. Without limitation, any and all variations described, suggested or incorporated by reference in the documents incorporated by reference herein are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A video encoding system for encoding an input video signal having a plurality of pictures including a particular picture, the particular picture having a plurality of unenlarged regions that includes first and second unenlarged regions that share at least one common boundary, comprising:
  a plurality of encoders, each encoder implemented as program code in at least one processor that, when executed, causes the at least one processor to perform (a) encoding a different enlarged region in a plurality of enlarged regions of said particular picture and (b) outputting a different unenlarged region in said plurality of unenlarged regions for said particular picture, wherein each enlarged region that is encoded by one of said plurality of encoders has a greater area than the unenlarged region output by said one of said plurality of encoders, wherein said plurality encoders include a first and second encoder, wherein encoding said different enlarged region in said plurality of enlarged regions comprises:
said first encoder receiving at least part of the particular picture and encoding a first enlarged region and outputting an encoded version of the first unenlarged region, wherein the first enlarged region has a larger area than said first unenlarged region;
said second encoder receiving at least part of the particular picture and encoding a second enlarged region and outputting an encoded version of the second unenlarged region; and
a multiplexer providing an output stream which includes, for the particular picture, the encoded version of the first unenlarged region from the first encoder and the encoded version of the second unenlarged region from the second encoder.

2. The system of claim 1, wherein the second enlarged region encoded by the second hardware or software includes a region overlapping with the first enlarged region.

3. The system of claim 2, wherein the first and second unenlarged regions each contain an integer number of encoders.

4. The system of claim 2, wherein the particular picture further has a third enlarged region which partially overlaps with the second enlarged region,
wherein the second unenlarged region overlaps with a third unenlarged region, and
wherein the system further comprises a third encoder receiving at least part of the particular picture and encoding the third unenlarged region and outputting an encoded version of the third enlarged region as the third unenlarged region,
wherein the output stream provided by the multiplexer further includes the third unenlarged region from the third encoder.

5. The system of claim 1, wherein the first and second unenlarged regions each define a respective slice of the particular picture.

6. The system of claim 1, wherein the first and second unenlarged regions each define a respective integer number of tiles of the particular picture.

7. The system of claim 1, wherein the first unenlarged region extends entirely across the particular picture horizontally.

8. The system of claim 1, wherein the first unenlarged region extends horizontally across only a first horizontal range of the particular picture.

9. The system of claim 1, wherein the first unenlarged region extends entirely across the particular picture vertically.

10. The system of claim 1, wherein the first encoder encodes the first unenlarged region as a first spatial section of the particular picture, and encodes a first extension region as a second spatial section of the particular picture, wherein said first extension region corresponds to a remaining portion of said first enlarged region which is not in said first unenlarged region, and
wherein the encoding of the first unenlarged region takes into account encoding data selected from the group consisting of a motion vector from the first extension region, a coding mode decision from the first extension region, a choice from the first extension region of a reference picture, and a reconstructed pixel value from the first extension region.

11. The system of claim 1, wherein the encoder encodes the first unenlarged region as a first spatial section of the particular picture, and encodes a first extension region as a second spatial section of the particular picture, wherein said first extension region corresponds to a remaining portion of said first enlarged region which is not in said first unenlarged region,
wherein the encoding of the first extension region takes into account encoding data selected from the group consisting of a motion vector from the first unenlarged region, a coding mode decision from the first unenlarged region, a choice from the first unenlarged region of a reference picture, and a reconstructed pixel value from the first unenlarged region.

12. The system of claim 1, wherein the particular picture further has a third unenlarged region sharing at least a second common boundary with the first unenlarged region,
wherein the first enlarged region extends across the second common boundary into the third unenlarged region.

13. The system of claim 12, wherein the first encoder encodes the first unenlarged region as a single spatial section of the particular picture.

14. The system of claim 12, further comprising a third encoder receiving at least part of the particular picture and encoding the third unenlarged region and outputting an encoded version of the third unenlarged region,
wherein the output stream provided by the multiplexer further includes the encoded version of the third unenlarged region from the third encoder.

15. One or more non-transitory computer-readable storage mediums for encoding an input video signal having a plurality of pictures including a particular picture, the particular picture having a plurality of unenlarged regions that includes first and second unenlarged regions sharing at least one common boundary, which when executed by one or more processors, cause:
a plurality of hardware or software encoding units that each perform (a) encoding a different enlarged region in a plurality of enlarged regions of said particular picture and (b) outputting a different unenlarged region in said plurality of unenlarged regions for said particular picture, wherein each enlarged region that is encoded by one of said plurality of hardware or software encoding units has a greater area than the unenlarged region output by said one of said plurality of hardware or software encoding units,
wherein said plurality of hardware or software encoding units include a first and second hardware or software encoding units, wherein encoding said different enlarged region in said plurality of enlarged regions comprises:
said first hardware or software encoding unit encoding the first enlarged region, and
said second hardware or software encoding unit encoding the second enlarged region; and
providing an output stream which includes, for the particular picture, the encoded version of the first unenlarged region from the first hardware or software encoding unit and the encoded version of the second unenlarged region from the second hardware or software encoding unit.

16. The one or more non-transitory computer readable storage mediums of claim 15, wherein the second enlarged region encoded by the second hardware or software includes a region overlapping with the first enlarged region.

17. The one or more non-transitory computer readable storage mediums of claim 16, wherein the particular picture further has a third enlarged region which partially overlaps with the second enlarged region, wherein the second enlarged region encoded by the second hardware or software encoding unit overlaps with a third unenlarged region, and wherein execution of the one or more sequences of instructions further cause:

a third hardware or software encoding unit receiving at least part of the particular picture, encoding the third enlarged region, and outputting an encoded version of the third unenlarged region, wherein the third enlarged region comprises a greater area than the third unenlarged region, and wherein the output stream further includes the encoded version of the third unenlarged region from the third encoding unit.

18. The one or more non-transitory computer readable storage mediums of claim 15, wherein the first hardware or software encoding unit encodes the first unenlarged region as a single spatial section of the particular picture.

19. The one or more non-transitory computer readable storage mediums of claim 15, wherein the first hardware or software encoding unit encodes the first enlarged region as a first spatial section of the particular picture, and encodes a first extension region as a second spatial section of the particular picture, wherein said first extension region corresponds to a remaining portion of said first enlarged region which is not in said first unenlarged region, and wherein the encoding of the first unenlarged region takes into account encoding data selected from the group consisting of a motion vector from the first extension region, a coding mode decision from the first extension region, a choice from the first extension region of a reference picture, and a reconstructed pixel value from the first extension region.

20. The one or more non-transitory computer readable storage mediums of claim 15, wherein the first hardware or software encoding unit encodes the first enlarged region as a first spatial section of the particular picture, and encodes a first extension region as a second spatial section of the particular picture, wherein said first extension region corresponds to a remaining portion of said first enlarged region which is not in said first unenlarged region, and wherein the encoding of the first extension region takes into account encoding data selected from the group consisting of a motion vector from the first unenlarged region, a coding mode decision from the first unenlarged region, a choice from the first unenlarged region of a reference picture, and a reconstructed pixel value from the first unenlarged region.

21. The one or more non-transitory computer readable storage mediums of claim 15, wherein the particular picture further has a third unenlarged region sharing at least a second common boundary with the first unenlarged region, and wherein the first enlarged region encoded by the first hardware or software encoding unit extends across the second common boundary into the third unenlarged region.

22. The one or more non-transitory computer readable storage mediums of claim 21, wherein the first hardware or software encoding unit encodes the first unenlarged region as a single spatial section of the particular picture.

\* \* \* \* \*